US009047534B2

(12) United States Patent
Harmanci et al.

(10) Patent No.: US 9,047,534 B2
(45) Date of Patent: Jun. 2, 2015

(54) METHOD AND APPARATUS FOR DETECTING NEAR-DUPLICATE IMAGES USING CONTENT ADAPTIVE HASH LOOKUPS

(75) Inventors: Oztan Harmanci, San Jose, CA (US); Ismail Haritaoglu, San Jose, CA (US)

(73) Assignee: Anvato, Inc., Mountain View, CA (US)

( * ) Notice: Subject to any disclaimer, the term of this patent is extended or adjusted under 35 U.S.C. 154(b) by 57 days.

(21) Appl. No.: 13/572,075

(22) Filed: Aug. 10, 2012

(65) Prior Publication Data

US 2013/0039584 A1 Feb. 14, 2013

Related U.S. Application Data

(60) Provisional application No. 61/522,416, filed on Aug. 11, 2011.

(51) Int. Cl.
*G06K 9/48* (2006.01)
*G06K 9/38* (2006.01)
*G06K 9/46* (2006.01)
*G06F 17/30* (2006.01)

(52) U.S. Cl.
CPC ............. *G06K 9/38* (2013.01); *G06K 9/4671* (2013.01); *G06F 17/30247* (2013.01); *G06F 17/3028* (2013.01)

(58) Field of Classification Search
CPC ............. G06F 17/30244; G06F 17/30; G06F 17/30253; G06F 17/30247; G06F 17/00; G06F 17/30038; G06K 9/3233; G06K 9/6228; G06K 9/6262; G06K 9/4671; G06K 9/6212; G06K 9/00369; G06K 9/6202; G06K 9/6218; G06K 9/50; G06K 9/344; G06K 9/4638; G06K 9/0063; G06K 9/6256; G06K 9/00288; G06K 9/00275; G06K 9/627; G06K 9/00711; H04N 19/00963; H04N 9/8042; H04L 25/0222; H04L 25/03159; A61B 5/04842
USPC ......... 382/130, 190, 195, 197, 219, 220, 305, 382/321, 227, 128
See application file for complete search history.

(56) References Cited

U.S. PATENT DOCUMENTS

| | | | | | |
|---|---|---|---|---|---|
| 5,577,135 | A | * | 11/1996 | Grajski et al. | 382/253 |
| 5,917,943 | A | * | 6/1999 | Washizawa | 382/190 |
| 6,026,189 | A | * | 2/2000 | Greenspan | 382/226 |
| 6,173,275 | B1 | * | 1/2001 | Caid et al. | 706/14 |
| 6,404,925 | B1 | * | 6/2002 | Foote et al. | 382/224 |

(Continued)

OTHER PUBLICATIONS

D. G. Lowe, "Object Recognition from Local Scale-Invariant Features", in International Conference on Computer Vision, vol. 2, 1999, pp. 1-8.
K. Mihcak and R. Venkatesan, "Blind Image Watermarking Via Derivation and Quantization of Robust Semi-Global Statistics", in IEEE International Conference on Acoustics, Speech and Signal Processing, 2002, (4 pages).
T. Lindeberg, "Feature Detection with Automatic Scale Selection", International Journal of Computer Vision, vol. 30, No. 2, 1998, pp. 1-51.

(Continued)

*Primary Examiner* — Vu Le
*Assistant Examiner* — Aklilu Woldemariam
(74) *Attorney, Agent, or Firm* — Boyle Fredrickson, S.C.

(57) ABSTRACT

A scalable and high performance near-duplicate image search method utilizing short hashes improves performance over existing methods. By leveraging the shortness of the hashes, the search algorithm analyzes the reliability of each bit of a hash and performs content adaptive hash lookups by adaptively adjusting the "range" of each hash bit based on reliability. Matched features are post-processed to determine the final match results. The method can detect cropped, resized, print-scanned and re-encoded images and pieces from images among thousands of images.

19 Claims, 8 Drawing Sheets

(56) References Cited

U.S. PATENT DOCUMENTS

| | | | |
|---|---|---|---|
| 6,539,395 B1* | 3/2003 | Gjerdingen et al. | 1/1 |
| 6,711,293 B1 | 3/2004 | Lowe | |
| 6,975,755 B1* | 12/2005 | Baumberg | 382/154 |
| 8,160,366 B2* | 4/2012 | Nakamura et al. | 382/190 |
| 8,200,021 B2 | 6/2012 | Iwamoto et al. | 382/195 |
| 8,515,212 B1* | 8/2013 | Bengio et al. | 382/305 |
| 2002/0159641 A1* | 10/2002 | Whitney et al. | 382/219 |
| 2003/0195883 A1* | 10/2003 | Mojsilovic et al. | 707/6 |
| 2005/0125368 A1* | 6/2005 | Akahori | 706/12 |
| 2006/0101060 A1* | 5/2006 | Li et al. | 707/102 |
| 2007/0025606 A1* | 2/2007 | Gholap et al. | 382/128 |
| 2007/0217676 A1* | 9/2007 | Grauman et al. | 382/170 |
| 2008/0166057 A1* | 7/2008 | Nakajima | 382/229 |
| 2009/0324026 A1* | 12/2009 | Kletter | 382/124 |
| 2011/0219035 A1* | 9/2011 | Korsunsky et al. | 707/784 |

OTHER PUBLICATIONS

A. Andoni and P. Indyk, "Near-Optimal Hashing Algorithms for Approximate Nearest Neighbor in High Dimensions", in Proceedings of the Symposium on Foundations of Computer Science, Jan. 2006, 10 pages.

A. Joly, O. Buisson and C. Frélicot, "Content-based Copy Retrieval using Distortion-based Probabilistic Similarity Search", IEEE Transactions on Multimedia, vol. 9, No. 2, p. 1-14, Feb. 2007.

J. Matas, O. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

* cited by examiner

METHOD AND APPARATUS FOR DETECTING NEAR-DUPLICATE IMAGES USING CONTENT ADAPTIVE HASH LOOKUPS

CROSS-REFERENCE TO RELATED APPLICATIONS

This application claims priority to U.S. provisional application Ser. No. 61/522,416, filed Aug. 11, 2011, the entire contents of which is incorporated herein by reference.

BACKGROUND OF THE INVENTION

1. Field of the Invention

The present disclosure relates primarily to image detection and, more specifically, to detecting near-duplicate images in printed material.

2. Discussion of the Related Art

As is known to those skilled in the art, detection of duplicate, or near-duplicate, images in a large database requires finding a robust interest point and extracting the visual features surrounding that interest point. Consequently, significant effort has been expended on interest point detection and feature extraction. However, it remains a significant challenge to detect images that have been scaled in size or otherwise modified from the original image.

Present algorithms for identifying matching images in a database to the modified image require an undesirably long search time that may grow significantly as the size of the database increases. Thus, it would be desirable to provide an method of rapidly and reliably detecting duplicate, or near-duplicate, images that have been modified by, for example, re-encoding, printing, scanning, resizing, or otherwise resealing the image.

BRIEF DESCRIPTION OF THE INVENTION

A scalable and high performance near-duplicate image search method utilizing short hashes improves performance over existing methods. By leveraging the shortness of the hashes, the search algorithm analyzes the reliability of each bit of a hash and performs content adaptive hash lookups by adaptively adjusting the "range" of each hash bit based on reliability. Matched features are post-processed to determine the final match results. The method can detect cropped, resized, print-scanned and re-encoded images and pieces from images among thousands of images.

A method according to one embodiment of the invention uses local features to be able to detect cropped and shifted images and segments. Scale invariance is achieved by computing a local scale for the feature and incorporating the scale in the feature computations. The extrema are picked in the scale space, and a linear transform of the local data is used to compute local features. Features are quantized and become the hashes, which, in turn, become the keys in a key-value table.

Searching for features is performed using content adaptive hash lookups. Using the computed hashes directly on key-value tables to perform searches is typically not successful because the query hashes must exactly match the original hashes. However, an exact match is hard to achieve due to typical image modifications, including, but not limited to, re-encoding, print-scan, resizing, rotation, or mismatched interest points. A reliability function which depends on the content of each bit compensates for image modifications to adjust the search range of each hash bit.

At indexing time, the quantized features are inserted directly into the table. At search time, each quantized feature is associated with a per-bit reliability value, which is a function of the quantization and feature extraction methods utilized. If a bit is not reliable, the range of the hash lookup is increased to compensate for the unreliability of the hash. Proper selection of the increased range removes the mismatches introduced by the unreliable bit and very high performance key-value table lookups result.

According to one embodiment of the invention, a method of generating a plurality of indexes to detect content in a query image related to content in at least one stored image includes the steps of identifying at least one interest point in the query image and generating a feature vector as a function of the interest point. The feature vector includes a plurality of data values, and each data value corresponds to a numeric representation of a feature of an additional point within a predetermined distance of the interest point. A first index is generated as a function of the feature vector, and a reliability vector, including a plurality of reliability values, is generated. Each reliability value corresponds to one of the data values of the feature vector. The indexes are generated as a function of the reliability vector and the first index.

According to another aspect of the invention, the method may further include the step of normalizing the feature vector prior to generating the first index. Normalizing the feature vector includes resizing the feature vector from a plurality of data values over the predetermined distance to a plurality of data values over a normalized distance. The first index may be generated using binary quantization of the feature vector, and the reliability values may be linearly proportional to an absolute magnitude of each of the data values in the feature vector.

According to still another aspect of the invention, the method may also include the steps of identifying at most five unreliable bits in the first index that have a reliability value less than a predetermined threshold, and generating a unique index for each combination of the unreliable bits.

According to yet another aspect of the invention, the plurality of indexes includes each of the unique indexes, and a plurality of interest points from each stored image is stored in a table. The table includes an index and data corresponding to the index for each of the interest points. The method may also include the steps of retrieving the data for the stored image corresponding to each of the plurality of indexes, comparing the data corresponding to the interest point in the stored image to the data corresponding to one of the interest points identified in the query image, and identifying a matching interest point if the data corresponding to the interest point identified in the query image matches the data corresponding to one of the interest points in the stored image. The content of the query image may be identified as matching the content of one of the stored images if at least three matching interest points are identified.

According to another embodiment of the invention, a method of identifying related images includes the steps of receiving a query image from an input device operatively connected to a processor, identifying at least one interest point in the query image, generating a feature vector for each interest point as a function of the interest point, generating a reliability vector as a function of the feature vector, comparing the query image to a plurality of other images, and identifying at least one image from the plurality of other images related to the query image as a function of the feature vector and the reliability vector. The method may further include the step of quantizing the feature vector. The reliability vector may be a function of the quantized feature vector.

According to another aspect of the invention, the method may include initial steps of identifying at least one interest point from the plurality of images, generating a feature vector for each interest point for the plurality of images as a function of the interest point, quantizing each feature vector for the plurality of images, and storing image data of the plurality of images in a database as a function of the quantized feature vectors. Quantizing the feature vector for the plurality of images generates an index to a table in the database, and the image data is stored in the database according to the index. Identifying at least one image may further include the step of generating a plurality of indexes to the table as a function of the reliability vector and the quantized value of each feature vector of the query image.

According to still other aspects of the invention, a scale space of the image around the interest point is normalized prior to generating the feature vector. At least three points of interest of the query image are related to corresponding points of interest in one of the plurality of other images, and image data of the query image located within a first triangle defined by the three points of interest of the query image is related to image data of the located image within a second triangle defined by the corresponding three points of interest for the other image.

According to yet another embodiment of the invention, a system for identifying related images includes an input device configured to receive a query image, at least one memory device storing a plurality of instructions and a plurality of images, and a processor operatively connected to the memory device. The processor is configured to execute the plurality of instructions to identify at least one interest point from the query image, generate a feature vector for each interest point as a function of the interest point, generate a reliability vector as a function of the feature vector, compare the query image to the plurality of images, and identify at least one image related to the query image from the plurality of images as a function of the feature vector and the reliability vector.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 5a is an exemplary image which may be stored or retrieved according to the present invention;

FIG. 5b schematically illustrates a technique for subdividing the exemplary image in FIG. 5a;

FIG. 5c schematically illustrates a technique for interest point identification of the image in FIG. 5a;

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
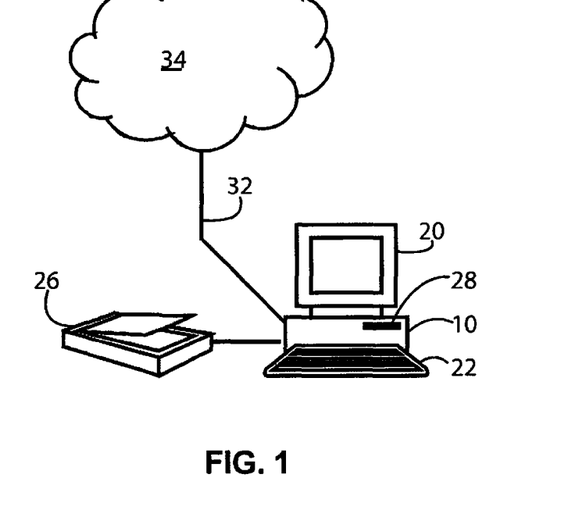
FIG. 1 schematically illustrates an exemplary system used for detecting near-duplicate images.
Figure 2:
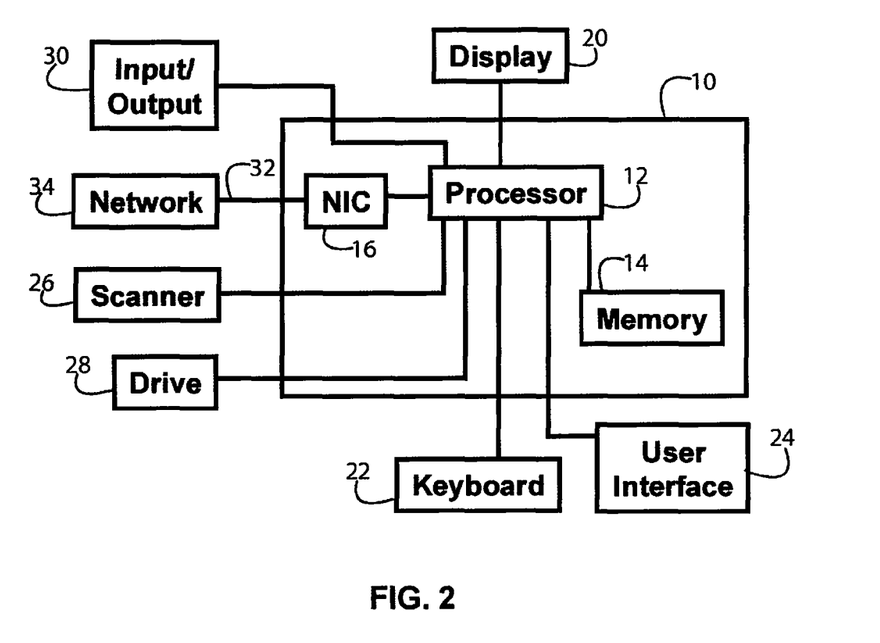
FIG. 2 is a block diagram representation of the exemplary system of FIG. 1.

Referring to FIGS. 1 and 2, a system for detecting near-duplicate images includes a computer 10 and related peripheral devices. The computer 10 may be, for example, a desktop, a laptop, a notebook, a server, or any other suitable processing device. The computer 10 preferably includes a display 20 to provide visual feedback to a user and a keyboard 22 to accept input from the user. The system may further include other suitable user interface 24 devices, for example, a mouse, a track ball, a touch screen, and the like. Image data may be received, for example, from a scanner 26 or via a cable 32 connected to a network 34. The network 34 may be internal or external, such as the Internet. Optionally, a drive 28 may accept corresponding storage media, including but not limited to, a floppy disk, a compact disc (CD), a digital video disc (DVD), or a memory card. Still other suitable input devices 30 such as a universal serial bus (USB) memory device may be connected to the computer 10. The computer 10 includes suitable interfaces, such as a network interface card (NIC) 16 to receive image data and transfer them to the processor 12. The processor 12 may act directly on the image data, store the image data in memory 14, or perform a combination thereof.

Figure 3:
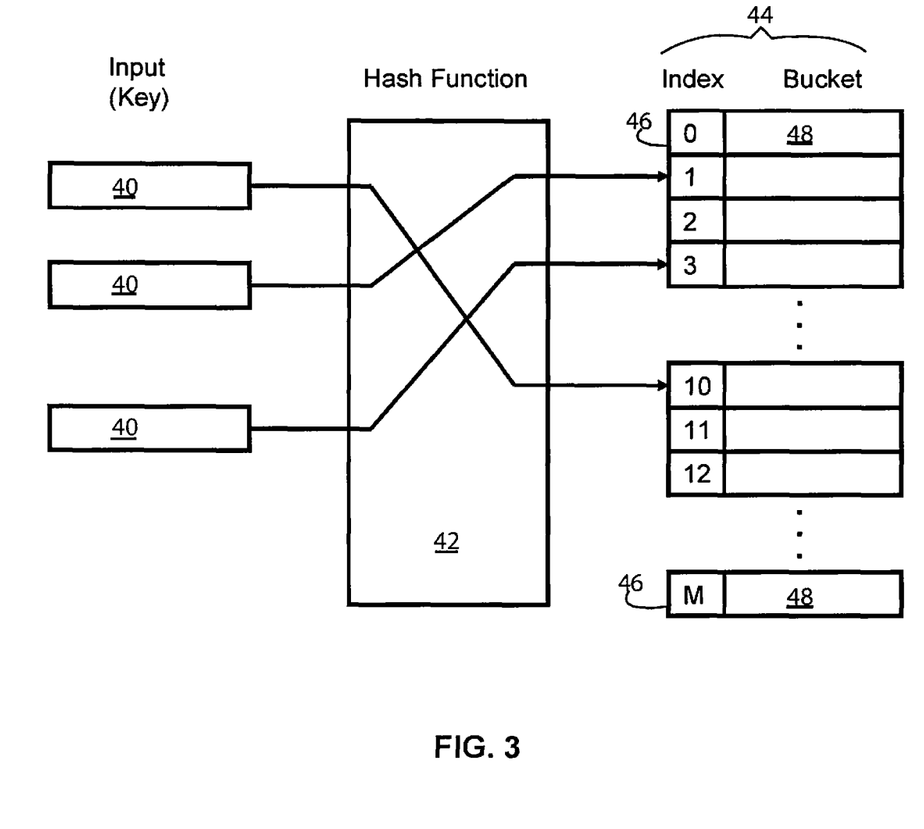
FIG. 3 is a block diagram representation of an indexing and/or a query operation according to one embodiment of the present invention.
Figure 5:
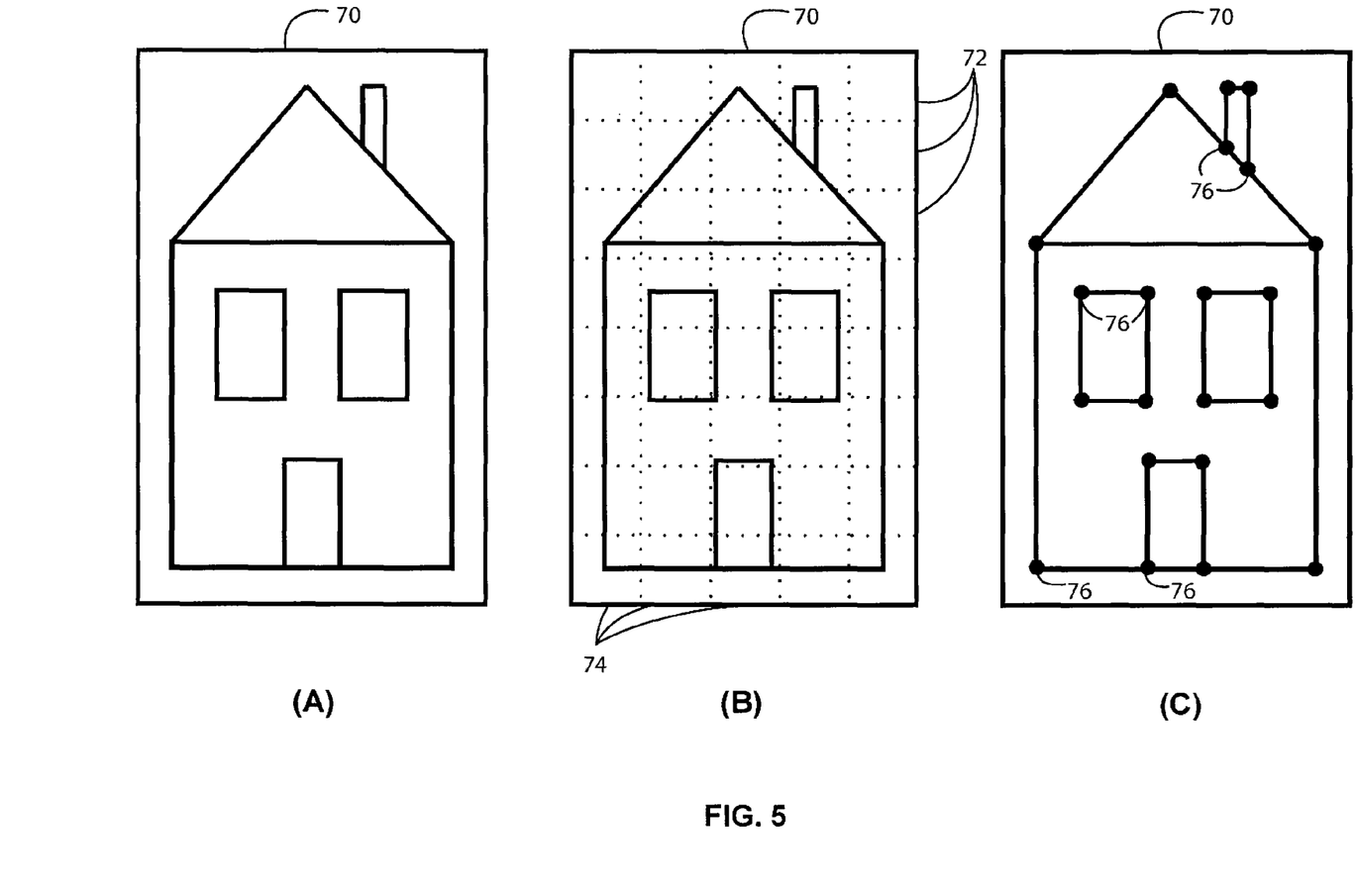

Hash tables provide an efficient method of storing and retrieving large quantities of data. As illustrated in FIG. 3, data to be stored in a hash table 44 is received as input 40 and passed through a hash function 42. The hash function 42 converts the input 40 to a numerical value which provides an index value 46 representing an entry 48, or bucket, in the hash table 44. The data is then stored at the identified bucket 48 in the hash table 44. Hash tables 44 are data structures that implement an associative array, storing data related to the input 40 in the data structure. For example, the hash table 44 may store a first numerical value identifying a feature of an interest point 76 (see also FIG. 5) such as the coordinates, the brightness, or the magnitude of color in a Red-Blue-Green color model of the interest point 76. The hash table 44 has at least two fields defined in the data structure per input 40 to be stored. The first field 46 is an index value identifying the position within the data structure that the item is stored and the second field 48 contains the data to be stored in the data structure. The hash function 42 is selected to transform the input 40 into the index value 46 such that the associated data may then be stored at that position within the hash table 44. The input 40 may be, for example, a second numerical value corresponding to the interest point 76 such as the coordinates, the brightness, or the magnitude of color in a Red-Blue-Green color model of the interest point 76. The input 40 is transformed by the hash function 42 into an index value 46 in the hash table 44. Therefore, the second numerical value is used to generate an index value 46 which identifies the point in the hash table 44 that the first numerical value is then stored. Preferably, the hash function 42 distributes inputs 40 in a generally uniform manner throughout the hash table 44.

Data is retrieved from the hash table 44 in a manner similar to storing the data in the hash table 44. An interest point 76 is identified and the second numerical value associated with the interest point 76 is provided as an input 40 to the hash function 42. The hash function 44 generates the index value 46 identifying the desired bucket 48 in the hash table 44 from which to read the first numerical value. For image recognition, the first and second numerical values may initially be determined based on an interest point 76 in a first image. The image data for the first image is then stored in the hash table 44. An interest point on a second image may then be used to generate another set of first and second numerical values. The hash function 44 generates an index value 46 based on the data from the second image. The data stored in the hash table 44, which corresponds to the first image, at the index value 46 generated by data from the second image is read. If the data read from the hash 44 matches the data corresponding to the interest point 76 of the second image, a match is detected. Because copying, image transformation, and noise may introduce variations in the data between two images, copies of images may not always return a match. As discussed in more detail below, the present invention provides an improved method for indexing and retrieving data from a hash table.

Figure 4:
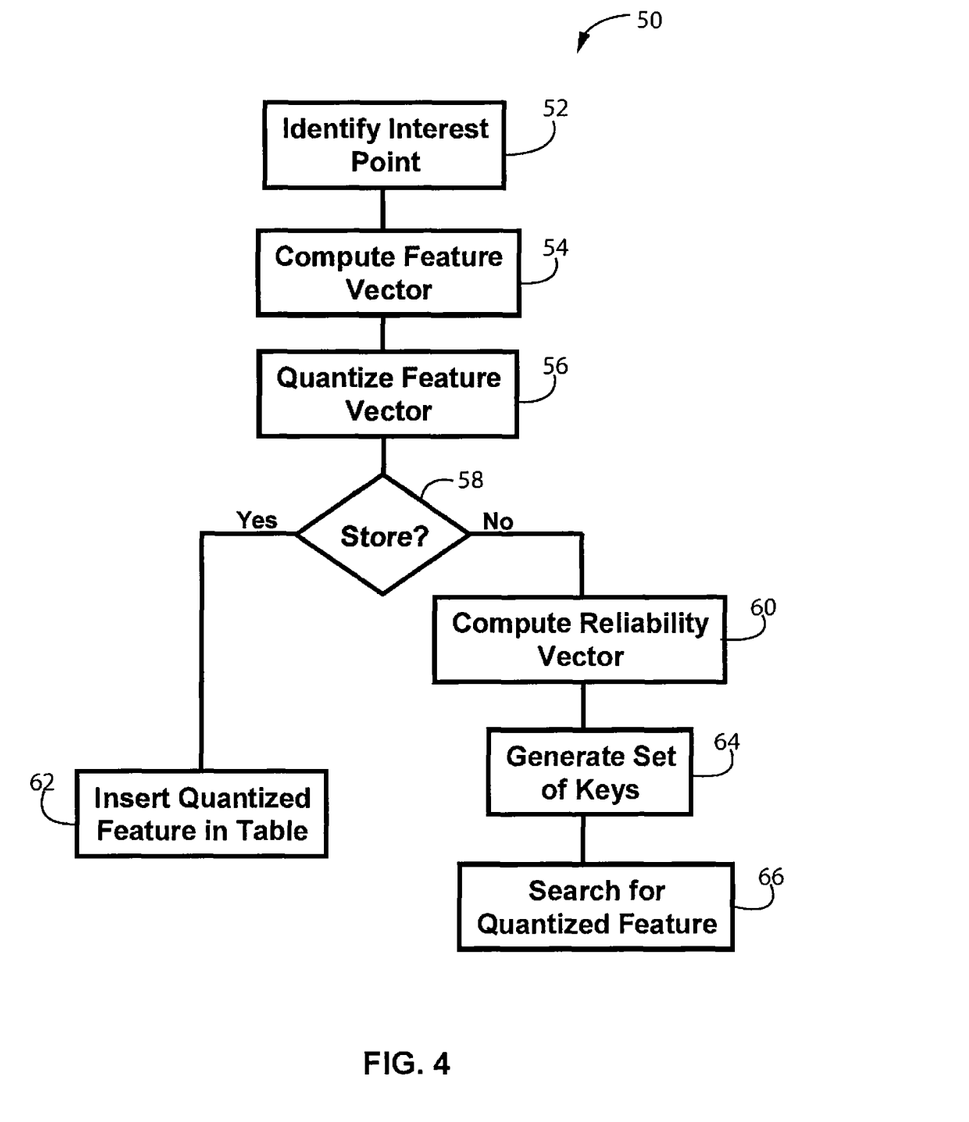
FIG. 4 is a flowchart illustrating the process of indexing and/or querying near-duplicate images.
Figure 6:
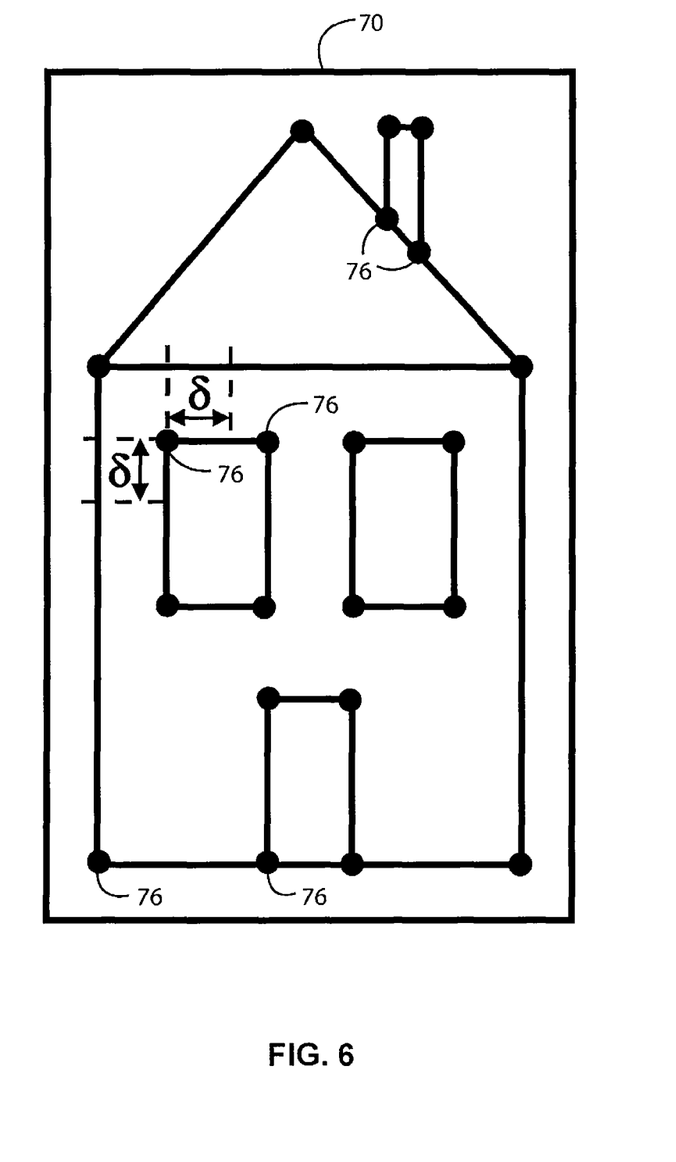
FIG. 6 schematically illustrates a technique for feature identification of one interest point identified in FIG. 5c.

Referring next to FIG. 4, an exemplary process 50 of inserting and retrieving image data into the hash table 44 begins by identifying an interest point 76, see FIG. 5c, as shown in step 52. Interest points 76 are locations or features of images that are generally immune to image transformations such as scaling, compression, rotation, perspective transformation, and signal noise. By selecting an interest point 76 that is generally immune to image transformation, the interest point 76 is more likely to be present in a second image that is a duplicate of the first image even if the second image has been transformed in some manner. At step 54, a feature vector is computed based on a normalized region around the interest point 76. The feature vector may be a single-dimensional or multi-dimensional array of varying length that includes a numerical representation of image data around the interest point. Referring also to FIG. 6, a feature, such as the luminance, of additional points of the image within a preselected distance, δ, is numerically represented, for example, according to its brightness. These numerical values are stored within the feature vector. Having obtained the feature vector over the preselected distance, δ, a normalized feature vector having a fixed size is determined as a function of the first feature vector where any suitable method of resizing the feature vector may be used. The normalized feature vector is used as an input 40 to the hash function 42 which determines an index 46 within the hash table 44 at which the data from the interest point 76 is stored.

According to one embodiment of the invention, a binary quantization function is selected as the hash function 42. At step 56, the binary quantization function converts the normalized feature vector to an index value 46 for inserting data to or comparing data against the hash table 44. In other embodiments of the invention, it is contemplated that other quantization functions may be selected to generate the index value 46. The binary quantization function is a 1-bit scalar function that generates a zero or a one for each value in the feature vector. The binary quantization function may, for example, assign a one to the presence of a feature and a zero to the absence of a feature. Similarly, a threshold may be selected and the binary quantization function may return a one if the value in the feature vector is greater than the threshold and a zero if the value in the feature vector is less than the threshold. The resulting index value 46 is generated by concatenating each of the bits generated by the quantization function. The number of bits in the index value 46 defines the size of the hash table 44 and the amount of memory required to store the hash table 44. Thus, it is preferred to limit the number of values in the feature vector and, consequently, limit the number of bits in the index value 46. According to one embodiment of the invention, the feature vector may include forty values.

At step 58, a determination is made as to whether the quantized feature is being added to the hash table 44 or whether a search is being performed to identify a matching image. If a newly identified interest point 76 is being added to the hash table 44, the index value 46 is used directly to identify the relative location within the hash table 44 at which to store interest point 76, as shown at step 62. The data stored in the bucket 48 of the hash table may be any data associated with the interest point including, but not limited to, the coordinates of the interest point 76 and an identifier of the image from which the interest point 76 was detected.

However, if a search of the hash table 44 is being performed to identify a matching image, the feature vector from the second image used as the input value 40 and, consequently, the resulting index value 46 may not be identical to the feature vector from the original image used to generate the index value 46 by which the interest point 76 was stored. At step 60, a reliability vector is computed for use in the searching process. The reliability vector is of the same length as the feature vector and includes a reliability value corresponding to each of the data values in the feature vector. The reliability value provides a numerical weighting indicating which of the data values in the feature vector for the second image are more likely to return a match from stored data corresponding to a first image. According to one embodiment of the invention, the reliability value is linearly proportional to the absolute magnitude of each data value in the feature vector. Optionally, the reliability vector may provide an indication of the proximity of a data value to the boundary of the region represented by the feature vector. Still other reliability functions may be selected without deviating from the scope of the invention.

A set of indexes 46 is then generated at step 64 as a function of the reliability vector and the first index 46 previously generated at step 56. A determination of the least reliable bits in the first index 46 is made based on the reliability vector. For each of the unreliable bits, another index 46 is generated as a function of the quantization function used. For example, with a binary quantization function, a second index 46 may be generated in which the least reliable bit is set to its opposite value in the first index 46. If the least reliable bit is a one in the first index 46, it becomes a zero in the second index 46, and if the least reliable bit is a zero in the first index 46, it becomes a one in the second index. The data in the hash table 44 at both indexes 46 is then read and evaluated for a match between images. According to one embodiment of the invention, the five least reliable bits of the first index 46, as identified by the reliability vector, are selected and each of the various combinations of those bits are used to generate additional indexes 46, resulting in a set of 32 indexes at which data is retrieved from the hash table 44.

Local Feature Computation

According to one embodiment of the invention, the disclosed method uses local features to be able to detect cropped and shifted images and segments. Scale invariance is achieved by computing a local scale for the feature and incorporating the scale in the feature computations. The extrema in the scale space are selected and a linear transform of the local data is used to compute local features. Features are quantized and become the hashes, which in turn become the key values 46, also known as keys, in the hash table 44.

Feature computation is a two step process: i) detecting interest points, and ii) computing feature vectors using image data around the detected interest points.

Interest Point Detection

Interest point detection finds the points on an image, and their associated invariant scales, that are most likely to be reproduced under various transformations, such as scaling, compression, rotation, or general perspective transformations, or in the presence of signal noise. The interest points are represented as $p_i = \{x_i, y_i, z_i\}$, where $p_i$ denotes the i-th interest point between 1 and M found at coordinates $(x_i, y_i)$ with the corresponding scale $z_i$.

For each image, a scale space representation of the image is first generated. The most stable and uniformly distributed points of interest from the scale space representation of the image are selected. Preferably, a minimum number of interest points are identified in a given region. For example, a 200× 200 pixel region preferably includes at least three interest points and more preferably includes at least six interest points.

The size of the hash table 44 is dependent on the memory 14 available in the computer 10. In addition, there may be a predetermined number of images to index in the hash table 44. Consequently, each image is allocated a certain amount of memory, resulting in a finite number of interest points 76 to be selected for that image. "M" can be considered to denote the finite number of interest points 76. The most stable interest points 76 up to the allotted number, M, are then stored in the table 44.

Referring to FIGS. 5a-5c, an image 70 may be selected for storage in the hash table 44. The image 70 may be of varying size and resolution. As shown in FIG. 5b, if the region exceeds a certain size, it may be first divided into rows 72 and columns 74 such that smaller portions can be analyzed. Each region is analyzed to identify interest points 76. Any suitable interest point detection method may be implemented, including but not limited to, corner detection as shown in FIG. 5c. Preferably, the detection method is capable of detecting the same interest point 76 regardless of modifications performed on the image.

Feature Computation

For each interest point 76 that is detected, a feature vector is computed. The feature vectors preferably use local image data around the interest point 76 from the luminance channel only. The luminance channel provides an indication of the brightness of each pixel. Optionally, it is contemplated that other feature computation methods may be used without deviating from the scope of the invention.

The feature vector, $v_i$, is computed by transforming the pixels within a distance, δ, from the coordinates $(x_i, y_i)$ of the interest point as shown in FIG. 6. Preferably, a linear transformation of the pixels is used to provide robustness against minor geometric modifications and a desired level of differentiation. Alternately, any suitable non-linear transformation can also be used.

To achieve scale invariance between a query image and a saved image, we first resize each sub-image to the size L×L, where L is the fixed normalized region size around an interest point. L is selected according to the application requirements. The image data is then convolved with a 2-dimensional Gaussian filter defined by Equations 1 and 2. The resulting feature vector includes 40 total coefficients with 20 coefficients generated by $f_v$ and 20 coefficients generated by $f_h$.

$$f_v = G(\beta,\beta) - G(\beta,\gamma) \quad (1)$$

$$f_h = G(\beta,\beta) - G(\gamma,\beta) \quad (2)$$

where: $f_v$ is the Gaussian filter in the vertical direction,
$f_h$ is the Gaussian filter in the horizontal filter,
β is selected based on the size of the normalized region, and
γ is selected based on the size of the normalized region.

According to one embodiment of the invention, β is selected as ⅛ the magnitude of L and γ is selected as 1/24 the magnitude of L.

Indexing and Searching

Data is indexed, or stored, in the hash table based on keys generated from each feature vector. A feature vector, previously computed around an interest point 76 from a master image, is quantized into a numerical representation of the vector, and the resulting numerical value is the key, or index, value 46 into the hash table 44 at which the data is stored. The data stored in each bucket 48 are the coordinates of the interest point 76 corresponding to the feature vector and the identifier of the master image from which the interest point 76 was obtained.

According to one embodiment of the invention, quantization of the feature vector is performed using a 1-bit scalar quantizer applied to each element of the feature vector. The resulting key, $k_i$, is the concatenation of the quantized bits of the feature vector as shown in Equation 3. It is contemplated that any suitable quantization function may be used without deviating from the scope of the invention.

$$k_i = [Q(v_i(1)) Q(v_i(2)) \ldots Q(v_i(B))] \quad (3)$$

where: Q( ) denotes the quantization function, and
B is the number of coefficients in the feature vector.

A reliability value is computed in conjunction with the quantization of the feature vector for each key value to identify the reliability of the corresponding element. In combination with the linear transform and the 1-bit quantization routine previously described, the reliability of each element increases with the absolute magnitude of that element. Consequently, the reliability value may be selected as linearly proportional to the magnitude of each feature element and may be calculated as shown in Equation 4. The reliability vector is a function of the transformation used to determine the feature vector and a function of the quantization method utilized to determine the numerical value of the feature vector. Therefore, it is contemplated that other methods of calculating the reliability vector may be used without deviating from the scope of the invention.

$$r_i = [|v_i(1)| |v_i(2)| \ldots |v_i(B)|] \quad (4)$$

Whether the method invokes indexing or searching for an image, the image is processed as described above. If the method invokes indexing the image, the coordinates of the points of interest as well as the image identifier are directly inserted into a bucket 48 of the hash table 44 according to the key values 46 calculated from the quantized feature vector. Indexing is performed independent of the reliability values. However, searching incorporates the reliability values in the hash lookup process.

Searching is performed by content adaptive hash lookups from the hash table 44. In standard hash lookups, the query value must match the stored value. Consequently, searching for a stored image that is a duplicate, or near-duplicate, of a queried image requires matching at least one key from the queried image to a corresponding key in the hash table 44. However, in image identification, feature noise results in variations between the indexed image and the queried image. Feature noise is a change in an element of a feature vector due to a modification of the image including, but not limited to, resizing, scanning, printing, image compression, or misalignment. The content adaptive search generates a set of keys for each queried feature as a function of the reliability value to identify matches between the queried feature and a stored feature even if small differences exist between the two features. According to one embodiment of the present invention, the query image is related to a stored image according to Equation 5. The values of $\alpha$ and $\sigma_n$ may be selected using a training set of images to achieve an acceptable balance between detecting false positive and false negative search results. It is contemplated that searching may be performed by other methods which incorporate the reliability value without deviating from the scope of the present invention.

$$Q(v_i'(j)-\alpha\sigma_n) \langle Q(v_i(j)) \langle Q(v_i'(j)+\alpha\sigma_n) \quad (5)$$

where: $v_i(\ )$ is the feature vector of the stored image,
  $v_i'(\ )$ is the feature vector of the queried image,
  j is in the range of 1 to M,
  $\alpha$ is selected according to the application requirements, and
  $\sigma_n$ is the variance due to feature noise.

Because multiple keys may be generated for each queried feature, the resulting search could grow to an undesirable length, taking an undesirable amount of time and/or using an undesirably high percentage of system resources. Consequently, additional limitations are placed on the search to prevent such an occurrence. According to one embodiment of the invention, the number of unreliable bits is limited to, for example, 5 bits. As still another limitation, binary, or 1-bit quantization, is used. As a result, the number of potential combinations is $2^5$ or 32 possible keys to test for each of the queried feature vectors. It is contemplated that the number of unreliable bits may be less than or greater than five or still other methods of limiting the number of potential keys may be selected without deviating from the scope of the present invention.

Figure 7:
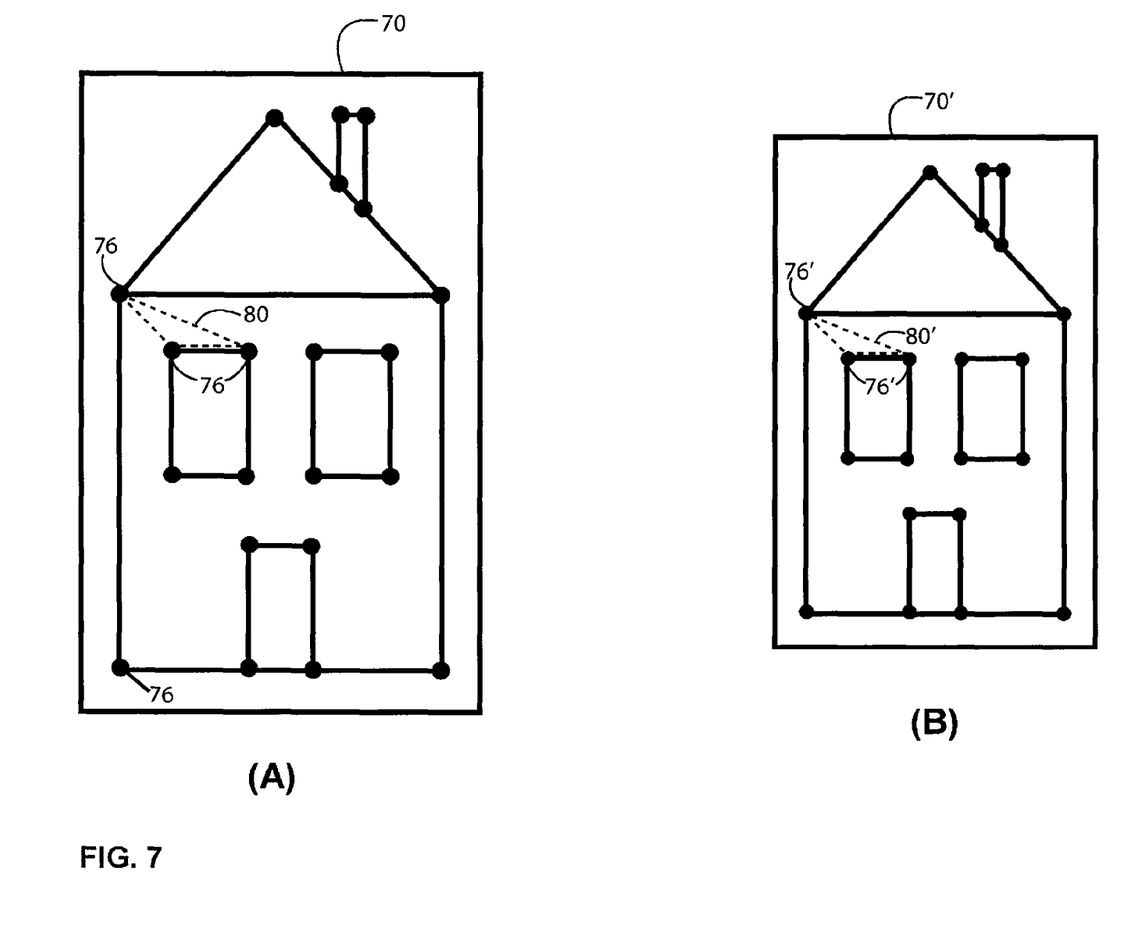
FIG. 7 schematically illustrates a technique for near-duplicate image identification according to one embodiment of the invention.
Figure 8:
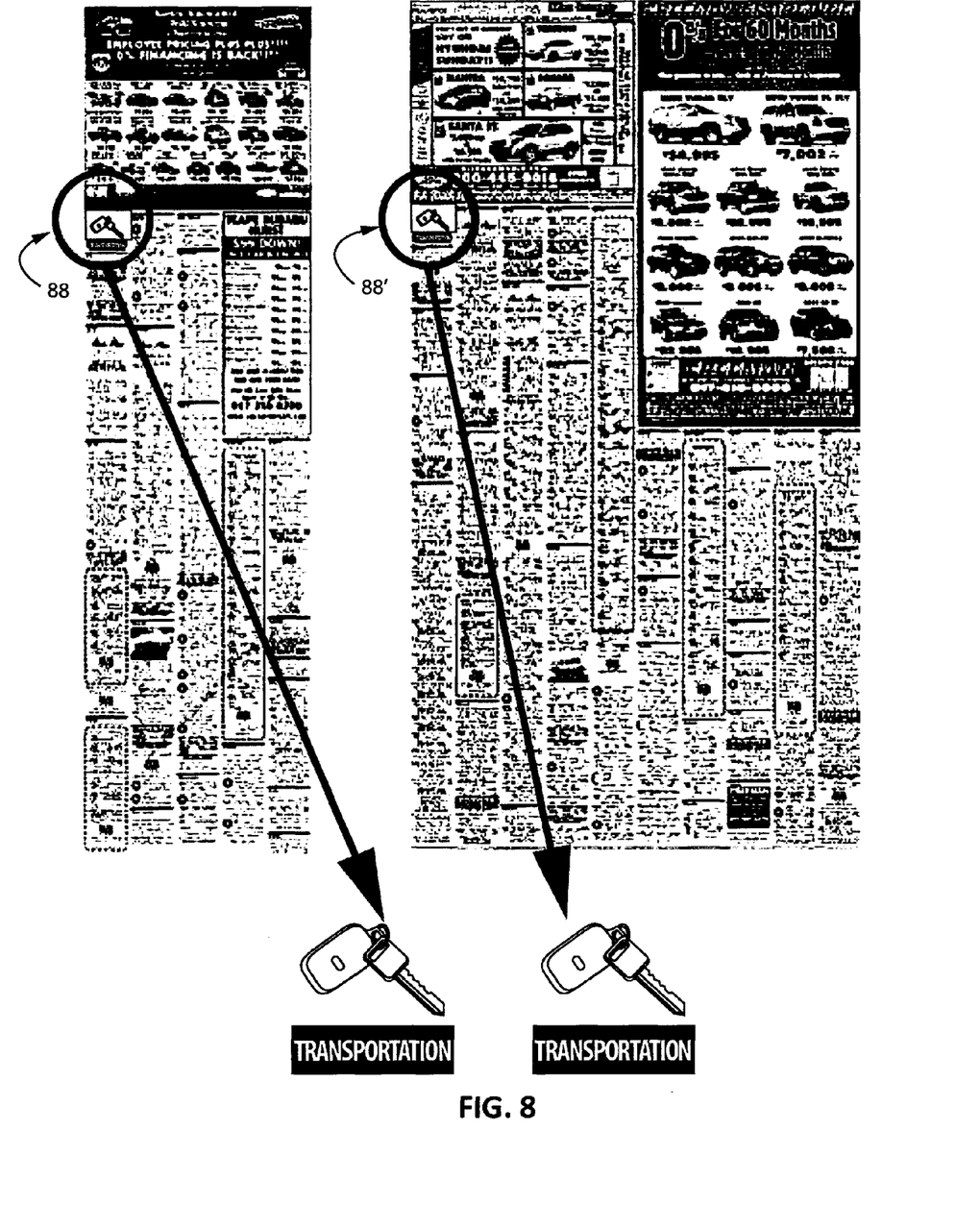
FIG. 8 schematically illustrates a technique for duplicate image identification from a portion of a full page query.
Figure 9:
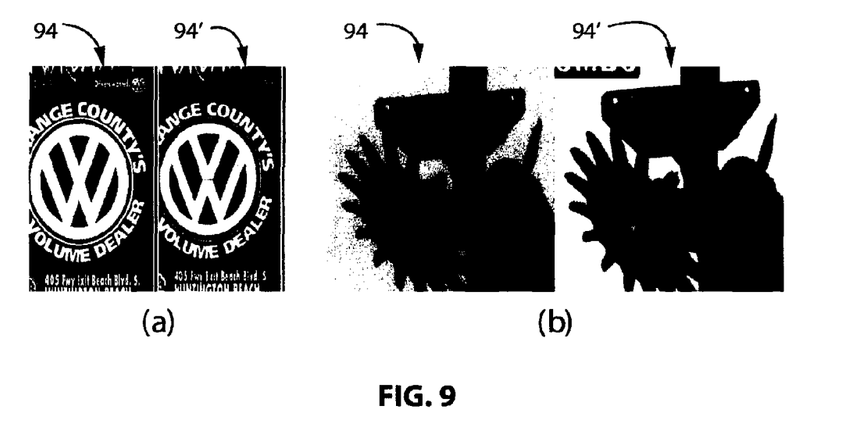
FIG. 9 illustrates partial matches of a modified image to a master image according to one embodiment of the invention.
Figure 10:
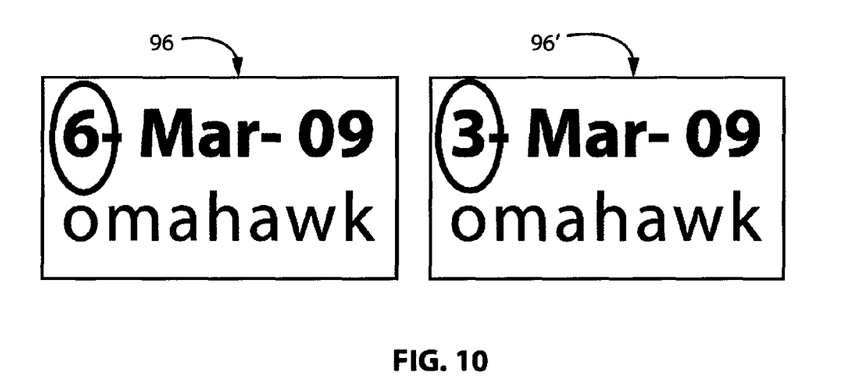
FIG. 10 illustrates an irregular partial match of a search image to a master image according to one embodiment of the invention.

Referring also to FIG. 7, an image match is reported if at least 3 matching keys are found and the triangles, 80 and 80', created by the corresponding locations on the master and query images, satisfy the triangle similarity conditions. Triangle similarity conditions are used to detect similar triangles, for example having two angles of equal measure, which indicate that the matching keys between the two images have similar spatial relationships within the image even if the actual distance varies, for example due to scaling of the image. This also increases the differentiation capability which is lowered due to short hashes. The region created by all such matching points is reported as a match. A match may be the whole query image, 94 and 94', between the master image and query image, respectively, as shown in FIGS. 9a-9b, or a partial region, 88 and 88', between the master image and query image, respectively, as shown in FIG. 8. The detection method may additionally return an irregular partial match of a portion, 96 and 96', of the master image and query image, respectively, as shown in FIG. 10. However, such results are acceptable when identifying near-duplicate images.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of generating a plurality of indexes based on content in a query image to detect related content in at least one stored image, wherein each index identifies a location within a hash table corresponding to each stored image, the hash table storing a plurality of feature vectors corresponding to the stored image, the method comprising the steps of:
   identifying at least one interest point in the query image;
   generating a feature vector for the query image by defining a data value corresponding to a numeric representation of a feature of the interest point and of a plurality of additional points within a predetermined distance of the interest point;
   generating a first index by quantizing the data values of the feature vector for the query image;
   generating a reliability vector including a plurality of reliability values, wherein the reliability vector is of the same length as the feature vector and each reliability value corresponds to one of the data values of the feature vector and provides a numerical weighting indicating which of the data values of the feature vector are more likely to match content in the at least one stored image;
   selecting a portion of the data values in the feature vector according to the corresponding reliability values of each data value; and
   generating the plurality of indexes corresponding to the selected portion of the data values.

2. The method of claim 1 further comprising the step of normalizing the feature vector prior to generating the first index, wherein normalizing the feature vector includes resizing the feature vector from a plurality of data values over the predetermined distance to a plurality of data values over a normalized distance.

3. The method of claim 1 wherein the first index is generated using binary quantization of the feature vector.

4. The method of claim 3 wherein the reliability values are linearly proportional to an absolute magnitude of each of the data values in the feature vector.

5. The method of claim 3 wherein selecting the portion of the data values in the feature vector includes identifying at most five unreliable bits in the first index that result from quantizing the data values and that have a reliability value less than a predetermined threshold and wherein generating the plurality of indexes includes inverting at least one unreliable bit and generating a unique index for each combination of the unreliable bits.

6. The method of claim 1 wherein a plurality of interest points from each stored image is stored in a table, the table including an index and data corresponding to the index for each of the interest points, the method further comprising the steps of:
retrieving the data for the stored image corresponding to each of the plurality of indexes;
comparing the data corresponding to the interest point in the stored image to the data corresponding to one of the interest points identified in the query image; and
identifying a matching interest point if the data corresponding to the interest point identified in the query image matches the data corresponding to one of the interest points in the stored image.

7. The method of claim 6 wherein the content of the query image is identified as matching the content of one of the stored images if at least three matching interest points are identified.

8. A. method of identifying related images, wherein at least one stored image is defined by a plurality of feature vectors stored in a hash table and wherein a position of each feature vector within the hash table is defined by an index into the hash table, the method comprising the steps of
receiving the query image from an input device operatively connected to a processor;
identifying at least one interest point in the query image;
generating a feature vector for each interest point by defining a data value corresponding to a numeric representation of a feature of the interest point and of a plurality of additional points within a predetermined distance of the interest point;
generating a reliability vector including a plurality of reliability values, wherein the reliability vector is of the same length as the feature vector and each reliability value corresponds to one of the data values of the feature vector and provides a numerical weighting indicating which of the data values of the feature vector are more likely to match content in the at least one stored image;
generating a first index by passing the feature vector for the query image through a hash function;
selecting a portion of the data values in the feature vector according to the corresponding reliability values of each data value;
generating a plurality of indexes corresponding the selected portion of the data values in the feature vector;
comparing the feature vector of the query image to the feature vector located at the first index and at each of the plurality of indexes within the hash table for each stored images; and
identifying at least one image from the plurality of other images related to the query image when at least one feature vector of the stored image matches one of the feature vectors of the query image.

9. The method of claim 8, wherein the step of generating the plurality of indexes includes quantizing the feature vector.

10. The method of claim 9 further comprising the initial steps of:
identifying at least one interest point from the plurality of stored images;
generating a feature vector for each interest point for the plurality of stored images as a function of the interest point;
quantizing each feature vector for the plurality of images; and
storing image data of the plurality of images in a database as a function of the quantized feature vectors.

11. The method of claim 10 wherein the step of quantizing the feature vector for the plurality of images generates an index to a table in the database and the image data is stored in the database according to the index.

12. The method of claim 11 wherein the step of identifying at least one image further includes the step of generating a plurality of indexes to the table as a function of the reliability vector and the quantized value of each feature vector of the query image.

13. The method of claim 8 further comprising the step of normalizing a scale space of the image around the interest point prior to generating the feature vector.

14. The method of claim 8 wherein at least three points of interest of the query image are related to corresponding points of interest in one of the plurality of other images.

15. The method of claim 14 wherein image data of the query image located within a first triangle defined by the three points of interest of the query image is related to image data of the located image within a second triangle defined by the corresponding three points of interest for the other image.

16. The method of claim 8 wherein at least a portion of the query image relates to a portion of the other image.

17. A system for identifying related images, comprising:
an input device configured to receive a query image;
at least one memory device storing a plurality of instructions and a plurality of images;
a processor operatively connected to the memory device, the processor configured to execute the plurality of instructions to:
identify at least one interest point from the query image;
generate a feature vector for the query image by defining a data value corresponding to a numeric representation of a feature of the interest point and of a plurality of additional points within a predetermined distance of the interest point;
generate a reliability vector including a plurality of reliability values, wherein the reliability vector is of the same length as the feature vector and each reliability value corresponds to one of the data values of the feature vector and provides a numerical weighting indicating which, of the data values of the feature vector are more likely to match content in the at least one stored image;
compare the query image to the plurality of images; and generate a first index as a function of the feature vector;
select a portion of the data values in the feature vector according to the corresponding reliability values of each data value; and generate a plurality of indexes corresponding to the selected data values wherein the first index and each of the plurality of indexes identifies a location within a hash table corresponding to each stored image, the hash table stored in the at least one memory device and including a plurality of feature vectors corresponding to the stored image; and identify at least one image related to the query image from the plurality of images as a function of the plurality of indexes.

18. The system of claim 17 wherein the first index is a binary value having forty or less bits and the processor is further configured to execute the plurality of instructions to:
identify at most five unreliable bits in the first index; and
generate the plurality of indexes as a function of the unreliable bits.

19. The system of claim 17 wherein the processor is further configured to identify the image related to the query image from the plurality of images if at least three matching interest points are identified.

* * * * *